US006747978B1

(12) United States Patent
Lewallen et al.

(10) Patent No.: US 6,747,978 B1
(45) Date of Patent: Jun. 8, 2004

(54) DIRECT MEMORY ACCESS PACKET ROUTER METHOD AND APPARATUS

(75) Inventors: Daniel D. Lewallen, Plano, TX (US); John A. Interrante, Richardson, TX (US); William M. Hurley, Wylie, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/322,423

(22) Filed: May 27, 1999

(51) Int. Cl.[7] .......................... H04L 12/28; H04L 12/54
(52) U.S. Cl. ...................... 370/401; 370/412; 370/428
(58) Field of Search ............................... 370/401, 402, 370/412, 414, 419, 423, 428, 429, 392, 396, 395.7, 470, 471, 389, 252; 710/22, 26, 250, 301, 306, 308; 709/244; 340/825.02

(56) References Cited

U.S. PATENT DOCUMENTS

| 5,293,488 | A | * | 3/1994 | Riley et al. ................. 395/200 |
| 5,764,859 | A | * | 6/1998 | Kim et al. ................ 395/700.8 |
| 5,991,817 | A | * | 11/1999 | Rowett et al. .............. 709/250 |
| 6,393,028 | B1 | * | 5/2002 | Leung ........................ 370/412 |

OTHER PUBLICATIONS

Cheng, Kelvin, "CDMA Interconnect Subsystem (CIS) Base Station Communication Network (BCN) Interface Card Hardware Design Document", Document No. 80–12173, pp. 21, 23–25, 37, 52–53, 60–61, 73–74, 77, 85, and 132, Revision X3 (Jun. 8, 1995).

Manavi, Payam, "CDMA Interconnect Subsystem (CIS) ATM Interface Card Hardware Design Document," Document No. 80–12179, pp. 21 and 40–42, Revision—(Jun. 2, 1995).

Knight, Bob, "CDMA Cellular Land Network DISCO Shelf Backplane Hardware Design Document," Document No. 80–12354–1, pp. 28–33, 38–44, 46–47, and 50, Revision—(Jul. 25, 1995).

Scipione, M., "CDMA Land Network Mini–BTS Digital Shelf Hardware Specification," Document No. 80–12659–1, pp. 30–35 and 44–50, Revision X2 (Jun. 4, 1995).

Author Not Given, "CDMA Cellular Land Network Universal Controller Card Hardware Design Document," Document No. 80–12195, pp. 1–1, 3–1 to 3–2, 3–4, 3–6, 4–4, 4–8, and 5–2, Revision—(May 9, 1995).

* cited by examiner

Primary Examiner—Duc Ho
(74) Attorney, Agent, or Firm—Carr LLP

(57) ABSTRACT

Disclosed is an apparatus for and method of routing telephony data packets by checking the address of each data packet as the data packet is sent to a common random access memory to be used by all of a plurality of router. The appropriate output link is ascertained by use of a lookup table accessible by each of the plurality of routers. The location of the data packet in memory is then sent to a FIFO entity associated with the appropriate output link. When the queue for that link reaches a pointer in the FIFO for that data packet, it is retrieved from memory and forwarded to its destination.

The design of the overall router entity facilitates monitoring of average input traffic as well as output traffic on each link at a data packet or byte level, monitoring the traffic of any input link by copying all data packets received from a given link to a monitoring link, restricting the capability of link sources from broadcasting data packets, checking individual or composite FIFO queue levels to determine the amount of time a link or links are operating at full capacity.

7 Claims, 4 Drawing Sheets

DIRECT MEMORY ACCESS PACKET ROUTER METHOD AND APPARATUS

TECHNICAL FIELD

The present invention relates in general to routing of telephony data packets and in particular to methods and systems for efficiently routing cellular telephony system data packets using direct memory access (DMA) while providing monitoring capability for predefined system parameters.

BACKGROUND

When cellular telephone messages, such as those used in PCS (personal communication service) are digitized, they are typically bundled into a plurality of data packets and transmitted over serial links to receiving parties. In a BSC (base station controller) the receiving parties may be either MSs (mobile stations) or land line entities. In the process, the data packets may pass through one or more entities known in the industry as routers. A router receives messages from a given link and redirects the message to one or more other links. In other words, a message may be directed to a single recipient or it may be broadcast to a plurality of destinations on a plurality of links. Since messages from multiple source links may be substantially simultaneously directed to a single destination link, routers need to provide some sort of temporary storage for messages when traffic prevents immediate output of received data packets. Usually this comprises a FIFO (first in first out) procedure which basically operates to cause messages awaiting output to be delayed until all previously received messages for a specific output link have been transmitted. A priority mechanism for data packets waiting to be acted upon is also required. Further, routers need to be able to direct incoming messages to the appropriate output link. An address provided with the message is examined and a decision is made by some entity in the router that messages having a given range of addresses, including the present address, should be directed to a specific output link.

Prior art PCS routers, known to the present inventors, when broadcasting a message, occasionally would direct messages back to a source link whereby a loop was created which overloaded a router to a point of uselessness. While prior art routers could copy all messages bound for a given active output link to an alternate router output for test and monitoring purposes, such prior art routers did not have similar copying and monitoring capability for incoming links. Further, prior art router systems were typically designed (over-designed) for worst case scenarios as there was no method of monitoring overall system capacity usage or individual output link usage. Such over-design results in increased costs for equipment that may well be underutilized. Finally, known prior art systems in cellular telephony systems have required a plurality of cards interconnected to a bus to provide the routing function with the potential of system inoperability from poor electrical contact between the cards and the bus.

A router having a design that may be accommodated on a single card would minimize contact failure problems. Further, a design that allows monitoring of number of bytes and/or packets received on input links may provide useful data in the form of excessive usage by a data packet source, excessive source link induced errors and relative destination distribution of messages input to a router from a source link as well as system capacity capability per source link. Monitoring the FIFO level of an output link may provide useful information for redistributing addresses assigned to a given output link. Monitoring total messages flowing through a router per unit of time may provide similar information for redistributing the total number of addresses for which a given link of the router is responsible.

Therefore a router that can provide all the above mentioned monitoring functions, can be configured to minimize broadcast looping situations, can minimize electrical contact problems, can allow operation closer to its design intent and still be physically more compact than the prior art would be a useful and desirable device.

SUMMARY OF THE INVENTION

The present invention comprises a router utilizing RAM (random access memory) for both temporary message packet storage and a message address to packet router output link lookup table. The design of the router permits monitoring of various parameters of input and output link messages as well as overall router usage for system optimization.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
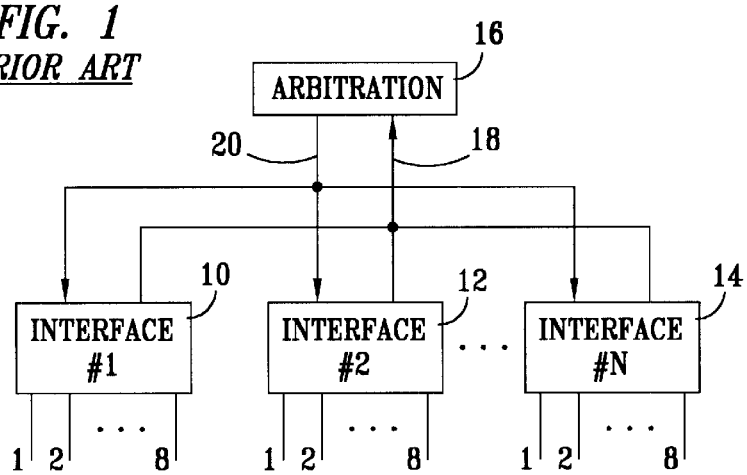
FIG. 1 is a block diagram of a prior art router entity.

In FIG. 1 there is shown a plurality of interface cards 10, 12 and 14 as well as an arbitration card 16. A bus 18 is used to transmit data packets to card 16 and a further bus 20 returns data packets to each of the interface cards. Each of the interface cards has a plurality of input channels or links which in one embodiment comprises 8 serial links. FIFO (first in first out) mechanisms within each of the interface cards coordinate the orderly transfer of input packets to the single high speed output bus 18. Such transfer occurs after a successful request is made to the arbitration card 16 by a given interface card and access to bus 18 is granted. The arbitration card 16 loops the incoming data packets back to the outgoing bus 20. Each of the data packets includes an address and each outgoing link of each interface card includes circuitry for detecting the address of each message occurring on bus 20. When a given link of an interface card detects an address in a range of address that the link should transmit, the data packet is retrieved and transmitted to the serial link for forwarding to a ultimate recipient.

Figure 2:
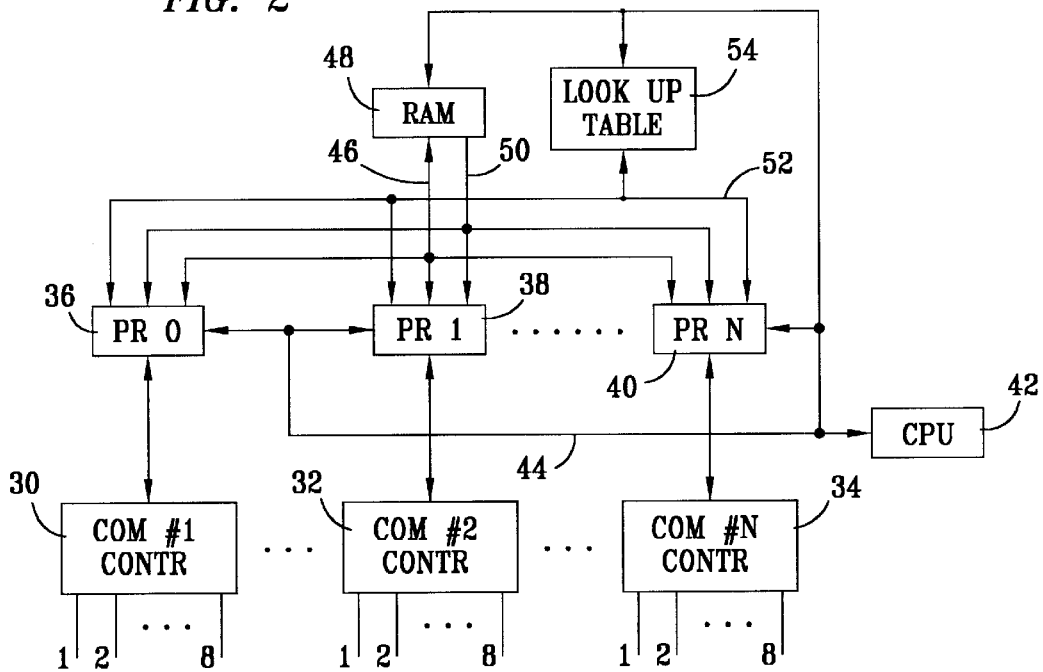
FIG. 2 is a block diagram of a router entity of the present invention.

In FIG. 2 communication control blocks 30, 32 and 34 represent a plurality of interface blocks from 1 to N. Each of these blocks receives a plurality (8) of serial links in a manner similar to that of FIG. 1. Further each of these blocks is in two way communication with a corresponding number of packet router (PR) blocks designated herein as 36, 38 and 40. A CPU (control processor unit) 42 is connected to receive and send messages from and to each of the PRs, and other blocks as shown over a connection 44. The CPU operates primarily for configuring block operation and interrupt monitoring of operations in the blocks. Each of the PRs may send messages and data packets over a communication bus 46 to a common random access memory 48 and receive replies and retrieve data packet from memory 48 over a communication bus 50. The bus 46 is also used in part to send data to the other PRs. In accordance with accepted design practices, the buses 46 and 50 may be common for all communications or may have separate paths for different types of communications. A further bus 52 provides two way communication between each of the PRs and a lookup table (LUT) 54.

In a preferred mode of operation, a data packet may appear on an input such as line 2 of communication block 32. An input FIFO mechanism (not shown), a register in a preferred embodiment of the invention, causes it to be temporarily stored until PR 38 can get to it. PR 38 checks the packet destination address of the packet and determines the length of the packet of data. PR 38 then accesses RAM 48 to determine space availability prior to sending the data packet to RAM 48 for temporary holding. RAM 48 returns a message that the packet may be stored at a given RAM address. The PR then sends the packet to RAM 48 for storage. If there is no apparent space available in RAM 48, PR 38 may still send the packet to a selected storage location in RAM 48 and overwrite the previously existing data packet. This location will preferably be the location of the oldest existing data packet in RAM 48. PR 38 will further advise CPU 42 of the overwriting since the situation should only occur due to a system or component fault. PR 38 also sends the destination address to LUT 54 to ascertain the output link for of the router mechanism for that destination address. The lookup process may occur simultaneously with sending the data packet to RAM 48. LUT 54, in a preferred embodiment, may have a re-programmable table that cross references a range (from 1 to M) of destination addresses to a given output link of one of the N communication control blocks 30–34. It may be assumed that the PR 38 determines from the LUT 54 that the packet just stored needs to be output on link 8 of block 34. PR 38 then informs all the PRs 40 via a broadcast message on link 46 that a packet contained in a given location of RAM 48 and having a given data length needs to be output on link 8. This message may comprise a pointer to the location within RAM 48. This message is detected by PR 40 and is stored in an output FIFO mechanism or register of PR 40 and after a period of time, in accordance with the number of prior message in the output FIFO, the data packet is retrieved from RAM 48. When the data packet is successfully retrieved, PR 40 sends a message to RAM 48 so that the space previously allocated to that data packet may be freed for use by another data packet.

Figure 3:
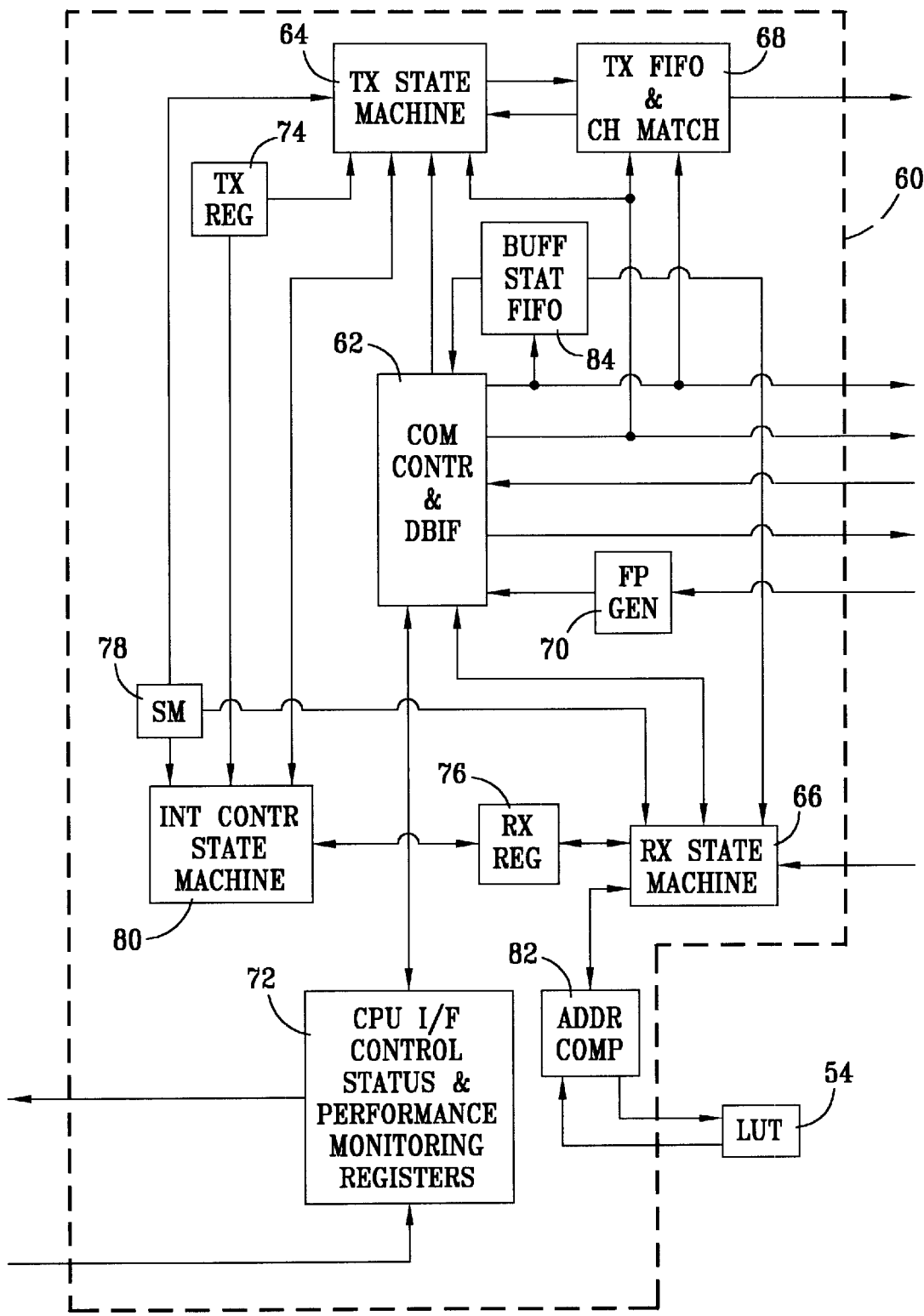
FIG. 3 is block diagram of the contents of a packet router of FIG. 2.

It is believed that the above information is fully adequate to teach one skilled in the art to practice the invention. However, a block diagram of the major components of one of the packet routers of FIG. 2 is shown in FIG. 3 within a dash line block 60. These components include a communication control and data buffer interface block 62 which is connected to the plurality of serial links and the RAM 48 through leads shown but not designated. Block 62 is further connected to transmit and receive state machines 64 and 66 respectively as well as to a transmit FIFO and channel matching block 68, a frame pulse generator 70 and a CPU (central processor unit) interface control status and performance monitoring register block 72. Block 72 also includes at least one counting mechanism to be discussed later. Additional blocks, connected as shown include transmit and receive registers 74 and 76, state machine block 78, and interrupt controller state machine block 80. Finally there are shown address compare block 82 and a buffer status FIFO block 84.

State machine block 78 activates the receive and transmit state machine blocks 66 and 64. As will be discussed in more detail in connection with FIG. 4, block 66 control access to Ram 48 and from the serial links via block 62. It acts to initiate the assertion of all control signals and loading of queue information from the receive register 76. It uses a time division multiplex scheme to access both blocks 62 and 48. As implemented in the preferred embodiment, it has access to the receive over the serial links ½ of the time and to transmit over the serial links the other ½ time. Access to RAM 48 was provided ⅙ of the time. In the preferred embodiment, 6 PRs were implemented in a single routing entity and thus each PR was allowed equal time access to RAM 48

The PR can perform back to back cycles of read and writes to each of the serial links within one frame. The receive and transmit directions do not have any requirement of working on the same channel and are not required to complete all of their actions at the same time. If one finishes before the other, then the one that is done just does nothing during its portion of the frame.

Figure 4:
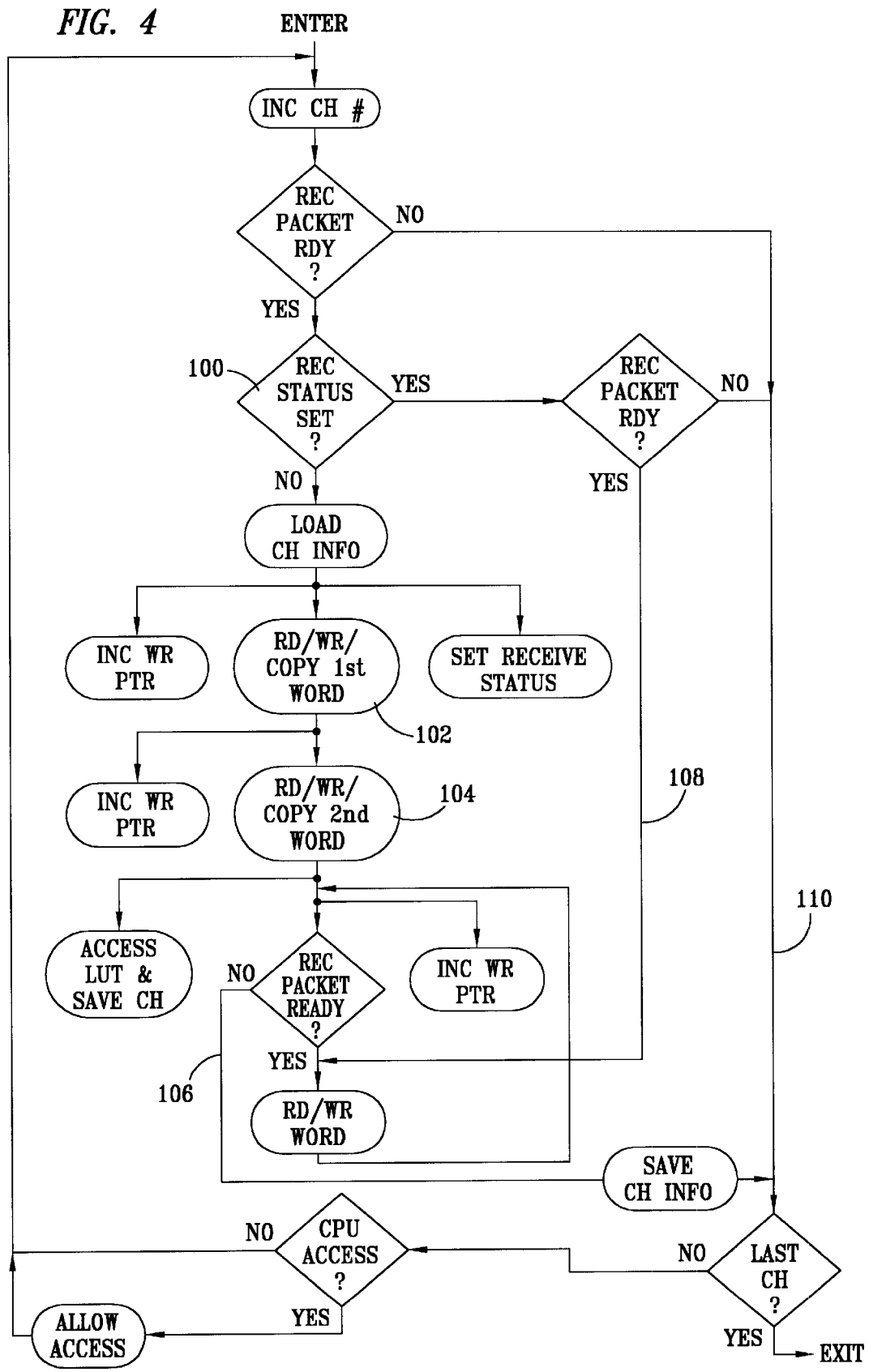
FIG. 4 is a flow diagram of the receive cycle of a state machine in FIG. 3.

Reference may now be made to the flow diagram of FIG. 4. When beginning to handle packets for the receive direction, the PR checks the receive message status bit of the RX status register 76 (as shown in decision block 100) for the channel being looked at to determine if the packet is a new one or if it was in the middle of handling a packet. If this bit is set to "1" or "yes", then the channel was in the middle of processing a packet, if set to "0", then it will begin to handle a new packet.

The PR will perform the following actions for each channel. If the packet is new, receive message status bit="0", and if the receive packet ready signal is set for the channel being examined, write pointer information is loaded from the RX status register 76, other wise the state machine goes to the next channel. The receive message status bit is set to 1. At this time the first two words are copied to an address holding register (as shown in steps 102 and 104) as well as writing it to RAM 48 during its time slot. The write pointer for each read is also incremented. During the 3rd read operation, the PR compares the address to a mask to determine if it is destined for a Backhaul Link connected to at least one of the serial links or to a MS. In either event, the PR uses the LUT to obtain the correct channel link or number. The priority bits from the control flag and the channel number are then stored in the register 76. Read and pointer increment operation cyclically continues until the receive packet ready signal for the channel goes away. A check is then made to see if this is the last channel. If it is not, the process is repeated. If it is, the process is exited as shown by path 106.

If the packet is not new but rather is continued, receive message status bit=1, and if receive packet ready signal is asserted, path 108 is followed and the write pointer information from the RX status register 76 is loaded, other wise the process goes to the next channel via a path 110. When not proceeding to the next channel, the process performs read and pointer increment operations until receive packet ready signal for the channel goes away.

Figure 5:
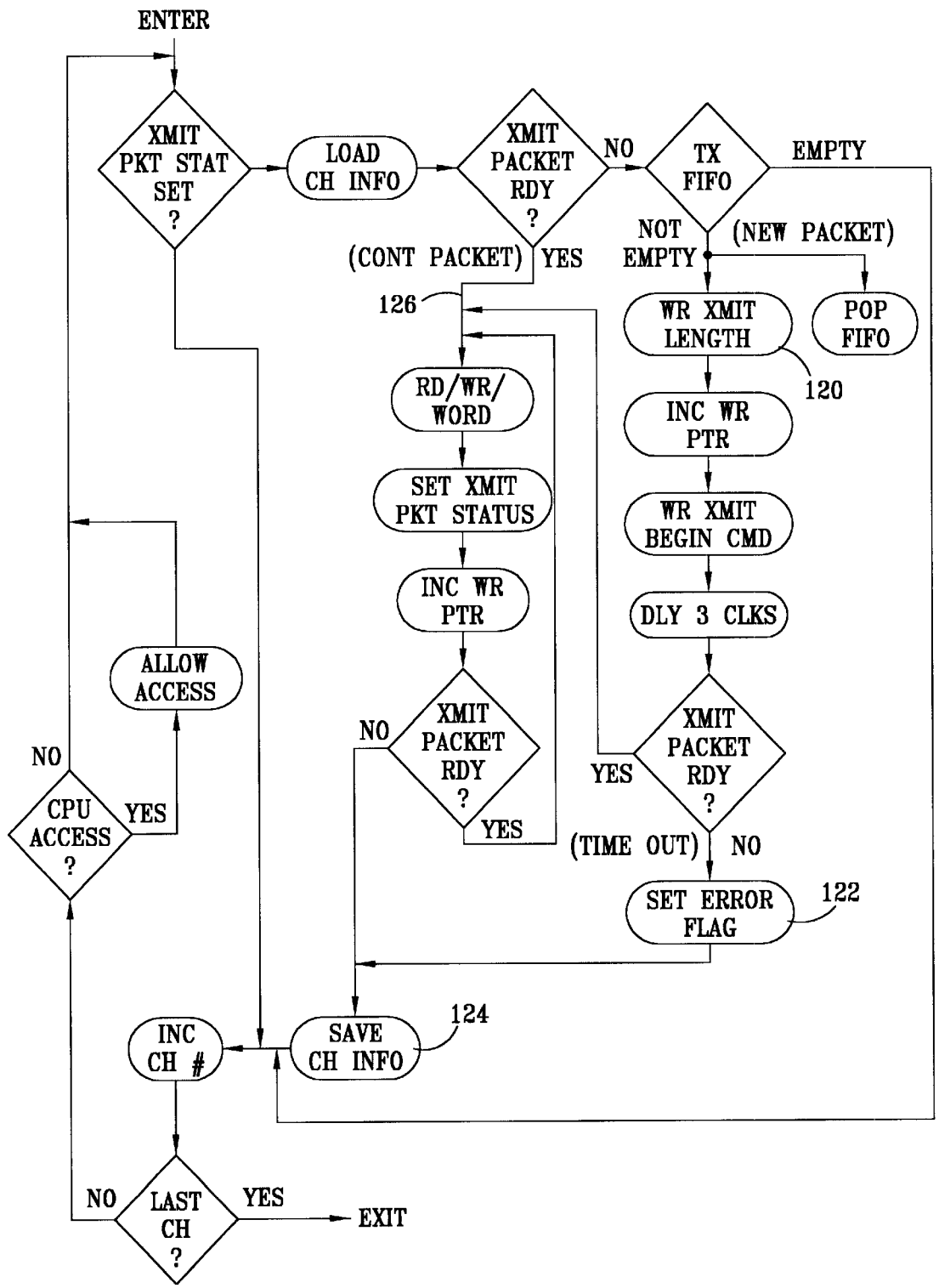
FIG. 5 is a flow diagram of the transmit cycle of the state machine in FIG. 3.

The PR can transmit packets along the lines of the process shown in FIG. 5 if a transmit packet status bit is clear and a packet is ready in the RAM 48 as indicated by the TX FIFO block 68. A packet can also be transmitted if the com control block 62 has a transmit packet ready signal for a channel pulled low and the transmit packet status bit is set for continuing a packet that has been partially transmitted as set forth in conjunction with FIG. 4. The TX state machine will check all channels status for the transmit packet status bit in the register 74 and an indication of packets in the TX FIFO block 68.

The PR performs the following actions for each channel. If the packet is new, transmit packet status bit=1), an 18 bit pointer from the register 74 of the channel being handled is loaded. The packet length from the memory 48 is read and written to the block 62 in accordance with a step 120. The transmit begin command is initiated and the transmit packet status bit is cleared. If the transmit packet ready signal goes low or the timer times out, an error flag is set in step 122. Otherwise, when the transmit packet ready signal for the channel goes active, the process begins cycles of reading from the RAM 48, writing to the output link and incrementing the read pointer. When the transmit packet ready signal goes away the pointer is written into the TX register 74 in step 124. If this is the last channel, the process is exited otherwise, the flow proceeds to the next channel.

If the packet is continued rather than being new, for the transmit packet status bit=0, path 126 is followed and the 18 bit pointer from the register 74 of the channel being handled is loaded. Cycles of reading from the RAM 48, writing to the output link and incrementing the read pointer repeats until the transmit packet ready signal goes away. As above, the pointer is written into the TX register 74 and a check is made to see if this is the last channel for this frame.

As mentioned above, interface control and monitoring block 72 may contain one or more counters for performance monitoring. A counter may be programmed to count either bytes or data packets passing through a given channel or link of the packet router per period of time such as one hour. One or more registers in block 72 may be used to record the counts such that a record may be retrieved of maximum average use of a link per chosen period over a prescribed amount of time such as a day or a week. Such a record may be used to provide a graph of average usage hour by hour over such a period of time. Other monitoring that may be accomplished in block 72 is to keep track of FIFO stack or queue levels of any one or more input or output links of a router in one or more registers. Such information provides an instantaneous indication of peak usage and time of such usage or it may be used to determine the amount of time that a link exceeds a given usage level. A register may thus be used to store and later provide information as to time of day that a FIFO stack exceeded a given level and/or the duration of time the level was exceeded. Further, the registers may be used to provide information as to the number of times per period of time, such as a day, that the given level was exceeded or the total time per period that the given level was exceeded. Such information is invaluable in determining when to add additional capacity to a system or redistribute the addresses assigned to a link and accordingly the traffic on a link.

The counting of data packets or bytes may be extended to all data links to determine total system usage or percent of available capacity. Similar information may be provided by checking the queue level of all of the FIFOs in a given PR or the entire packet routing entity.

Block 72 may also be used to monitor either an input or an output link. This may be accomplished by copying, all data packets received from or being output to a given link, to a link set up for monitoring or testing. Thus a profile may be generated of types or sources of traffic on a given input link. A measure of link quality may be obtained by checking for errors in received data packets. Excessive usage, known in the industry as a "babbler", by a given source may be determined. Many other tests may also be conveniently performed via the capability of reconfiguration commands from CPU 42 causing the copying all traffic for either an input or an output link to any link desired for monitoring.

Another capability of block 72 is that a broadcast capability of any link may be disabled, via configuration commands from CPU 42, to prevent "looping" conditions that may cause a router to become overloaded.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method of routing incoming addressed data packets to a predetermined one of a set of output links of a packet router comprising the steps of:

detecting the address of an incoming data packet;

determining the length of said incoming data packet;

storing the data packet in a given location of a common random access storage for all incoming data packets;

determining the output link corresponding to the detected address from a common lookup table for the set of output links of the packet router;

forwarding the given location and the length of the data packet to a FIFO (first in first out) register of said output link;

retrieving said data packet from said common random access storage when the given location and the length of the data packet are accessed at said output link through employing indicia of the common lookup table by the packet router;

transmitting the data packet over said output link; and disabling the ability to broadcast data packets to multiple addresses by reconfiguring a plurality of the links of said packet router.

2. Apparatus for routing incoming addressed data packets to a predetermined one of a set of output links comprising:

common lookup table means for storing address and associated link information;

a plurality of input/output links each including a FIFO (first in first out) entity, wherein a plurality of the input/output links are packet routers;

means for detecting the address of an incoming data packet on any of said plurality of input links;

means for determining the length of said incoming data packet;

random access storage means for storing said data packet in a given location;

means for determining which one of said plurality of links corresponds to the detected address from said common lookup table means;

means for forwarding the given location and the length of the data packet to the FIFO (first in first out) entity of the output link determined to be the one corresponding to the detected address;

means for retrieving said data packet from said random access storage when the given location and the length of the data packet are accessed through employing indicia of the common lookup table means at the FIFO at the determined output link;

means for transmitting the data packet over said output link; and means, for reconfiguring incorporated within a plurality of the links of said plurality of packet routers, for disabling the ability to broadcast data packets to multiple addresses.

3. Routing apparatus comprising:

random access storage means for storing a data packet in a given location;

common lookup table means for storing address and associated link information;

a plurality of serial links for both inputting and outputting a data packet, each serial link including a FIFO (first in first out) entity, wherein a plurality of the input/output links are packet routers;

means for checking said common lookup table means to determine the serial link which corresponds to an address contained in the stored data packet;

means for forwarding the given location and the length of the data packet to the FIFO (first in first out) entity of the serial link corresponding to the data packet contained address;

means for retrieving said data packet from said random access storage means, when the given location and the length of the data packet are accessed at the FIFO of the serial link through employing indicia of the common lookup table means, for transmission from the routing apparatus; and means for reconfiguring, incorporated within a plurality of the links of said plurality of packet routers, for disabling the ability to broadcast data packets to multiple addresses.

4. A method of monitoring incoming data packets received at a first router comprising the steps of:

determining the length of an incoming data packet;

storing the data packet in a common random access storage for all incoming data packets;

forwarding the stored location and the length of the data packet to a FIFO (first in first out) register of a monitor output link of a second packet router, wherein the reconfiguring ability exists in some of packet routers to disable the ability to broadcast to multiple addresses;

retrieving said data packet from said common random access storage when the given location and the length of the data packet are accessed at said monitor output link through employing indicia of a common lookup table by the second packet router.

5. Apparatus for monitoring incoming data packets received at a router having comprising:

a plurality of input/output links each comprising FIFO (first in first out) entity means, wherein a plurality of the input/output links are packet routers;

random access storage means for storing an incoming data packet of a given input/output link in a given location;

means for forwarding the given location of said data packet to said FIFO (first in first out) entity of one of said plurality of input/output links to be used as a monitor output link;

means for retrieving said data packet from said random access storage means when the given location and the length of the data packet are accessed at the monitor output link through employing indicia of the common lookup table; and means for reconfiguring, incorporated within a plurality of the links of said plurality of packet routers, for disabling the ability to broadcast data packets to multiple addresses.

6. A method of routing incoming addressed data packets to a predetermined one of a set of output links of a packet router comprising the steps of:

detecting the address of an incoming data packet;

storing the data packet in a given location of a common random access storage for all incoming data packets;

determining the output link corresponding to the detected address from a common lookup table for the set of output links;

forwarding the given location and the length of the data packet to said output link of the packet router;

retrieving said data packet from said common random access storage when the given location and the length of the data packet are accessed at said output link through employing indicia of a common lookup table by the packet router;

transmitting the data packet over said output link; and disabling the ability to broadcast data packets to multiple addresses by reconfiguring a plurality of the links of said packet router.

7. A data packet router entity comprising:

a plurality of packet routers each including a plurality of input and output channels for receiving and transmitting addressed data packets;

detection means for detecting the address of an incoming data packet;

random access storage for temporary storage of all incoming data packets;

common lookup table means for cross referencing addresses to a specific output channel of a specific packet router of said plurality of packet routers;

means for storing the data packet in a known location of said random access storage;

means for determining the output channel corresponding to the detected address from said common lookup table for the set of output channels;

means for forwarding a data packet location pointer to the output channel corresponding to the detected address;

means comprising a part of said output channel for retrieving said data packet from said random access storage when the data packet location pointer is accessed by said output channel through employment of indicia of the common lookup table;

means for transmitting the data packet over said output channel; and means for reconfiguring, incorporated within at least some of the channels of said plurality of packet routers, for disabling the ability to broadcast data packets to multiple addresses.

* * * * *